United States Patent [19]

Droho et al.

[11] Patent Number: 4,740,861

[45] Date of Patent: Apr. 26, 1988

[54] THERMAL PROTECTION DEVICE FOR A DUAL INPUT VOLTAGE LAMP TRANSFORMER/BALLAST APPARATUS

[75] Inventors: Joseph S. Droho, Chicago; Seymour Perkins, III, Hinsdale, both of Ill.

[73] Assignee: Advance Transformer Company, Chicago, Ill.

[21] Appl. No.: 938,656

[22] Filed: Dec. 5, 1986

[51] Int. Cl.⁴ .......... H02H 5/04

[52] U.S. Cl. .......... 361/105; 361/103; 315/119; 315/270; 315/309; 439/218

[58] Field of Search .......... 315/119, 270, 309; 339/32 R, 32 M; 361/103, 104, 105, 106

[56] References Cited

U.S. PATENT DOCUMENTS

| | | | |
|---|---|---|---|
| 3,631,322 | 12/1971 | Kruger | 361/103 |
| 4,386,333 | 5/1983 | Dillan | 339/33 |
| 4,400,673 | 8/1983 | Gilman | 315/119 |
| 4,487,466 | 12/1984 | Petit et al. | 339/33 |
| 4,536,817 | 8/1985 | Pejouhy | 361/105 |

*Primary Examiner*—A. D. Pellinen
*Assistant Examiner*—Jeffrey A. Gaffin
*Attorney, Agent, or Firm*—Thomas A. Briody; David R. Treacy; Bernard Franzblau

[57] ABSTRACT

A thermal protection device for a dual input voltage lighting fixture apparatus which includes a reversible connector for coupling either of two possible input voltages to the appropriate terminal of a winding of a transformer/ballast apparatus via a normally closed contact of a heat responsive thermal switch having a heating element electrically coupled to the reversible connector and thermally coupled to the closed contact. The latter contact opens in response to a level of heat above a given value. The transformer winding has two connection terminals, one of which is a tap point, connected to the reversible connector. The connection scheme provides the same energizing voltage to the heating element for each of the two different possible levels of the input voltage. The apparatus will automatically indicate if the connector is reverse connected for either of the two input voltages.

15 Claims, 1 Drawing Sheet

THERMAL PROTECTION DEVICE FOR A DUAL INPUT VOLTAGE LAMP TRANSFORMER/BALLAST APPARATUS

BACKGROUND OF THE INVENTION

This invention relates to apparatus for providing protection against thermal overloads in electric discharge lamp fixtures or the like, and more particularly to a thermal overload protection device especially adapted for use with a dual input voltage transformer/ballast apparatus for operation of electric lamps.

A provision set out in the National Electric Code 1987 version requires that certain fixtures must be thermally protected, e.g. indoor, recessed HID lamp fixtures. If this type of fixture is accidentally or otherwise covered by insulating material, or insulation material is placed too close to the fixture, then there is a substantial likelihood that the heat developed in the fixture will ignite the flammable insulation material and thereby cause a fire, with the attendant danger of a loss of property and/or life. Hence, the above addition to the National Electric Code of a requirement for a thermal overload protection device for a recessed HID lamp fixture.

A thermal protector is available that is designed to operate only with an AC supply voltage of 120 volts (60 Hz). However, the most popular ballast devices for use with HID lamp fixtures are rated for dual operation with input voltages of either 120 V or 277 V.

In order to provide thermal protection for a dual input voltage HID lamp ballast, it has been suggested to modify the transformer/ballast in the manner indicated in FIG. 1 of this application. A HID lamp ballast 1 is indicated diagrammatically and contains a transformer 2 having a primary winding 3 with the connections indicated by the dashed line. That is, a primary winding consisting of all of the winding turns between the terminals Y and Z. In order to modify this ballast device for use with dual input voltages of 277 V and 120 V and provide it with thermal overload protection, it has been proposed to break the connection shown in dashed lines and to connect the terminal 4 of the primary winding to an input terminal 5. A thermal switch consisting of a normally closed contact arm 6 (e.g. a bimetallic element), operative in response to heat applied thereto by a heating resistor 7, is connected to the terminal 5. The terminal X of the primary winding is now connected to the output contact of the normally closed switch. The heating resistor 7 is connected across the part of the winding between the terminals X and Z.

If the ballast device is to be used with a 277V input voltage, then the terminals 8 and 9 (connected to terminals Y and Z, respectively, of the transformer winding) are connected to the terminals of the 277 V supply voltage. In case of operation with a 120 V source, the terminals 5 and 9 are connected to the 120 V supply lines. In the event of a thermal overload, the normally closed contact arm 6 responds by opening the line to terminal X of the transformer winding.

The proposed circuit of FIG. 1 is subject to several limitations that make it relatively unattractive and impractical as a solution to the thermal overload problem. First of all, it requires a significant modification of the ballast device as a result of breaking the normal connection of the winding at point X thereof. In addition, with some ballast auto-transformers having taps and lamp loads above the voltage at terminal X, the opening of the normally closed switch arm 6 will not cut off the power to these loads. Furthermore, the job of a field installation technician is complicated by an additional lead from the transformer winding to terminal 5 etc.

SUMMARY OF THE INVENTION

It is therefore an object of the invention to provide a thermal protection device, for use with a dual input voltage ballast for discharge lamps, that will sense a lamp fixture over temperature condition and automatically disconnect the power to the transformer/ballast and/or provide a signal indication of such condition.

Another object of the invention is to provide a thermal protection device for a transformer/ballast apparatus that will operate with either of two given input voltages, such as, but not limited to, 120 V and 277 V.

A further object of the invention is to provide a thermal protection device for a discharge lamp transformer/ballast apparatus that does not require any significant modification of the transformer/ballast apparatus.

A still further object of the invention is to provide a thermal protection device for a dual input voltage transformer/ballast that overcomes the disadvantages of the prior art apparatus discussed above and which is simple to install in the field.

Another object of the invention is to provide a thermal protection device for a dual input voltage transformer/ballast that uses a reversible connector which cannot be unconsciously bypassed.

Another object of the invention is to provide a thermal protection device for a dual input voltage transformer/ballast that uses a reversible connector for the two different input voltages and which will automatically provide an indication or signal in the event that the connector is reversed by mistake.

The present invention provides a thermal protection device that satisfies the above objects by means of a non-polarized reversible connector, preferably a two-wire reversible connector, electrically connected to the primary winding of the ballast transformer in combination with a heat responsive thermal switch. It has been discovered that the proper choice of the connection points of the transformer winding to the reversible connector makes it possible to provide a thermal protection device that can be used with two different input voltages of substantially different levels.

BRIEF DESCRIPTION OF THE DRAWING

The above and other objects and advantages of the invention will become apparent from the following detailed description of the invention when read in conjunction with the accompanying drawing in which.

Figure 1:
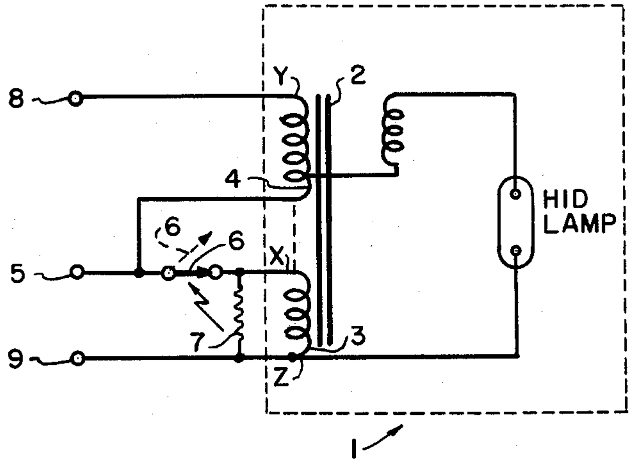
FIG.1 PRIOR ART
FIG. 1 is a circuit diagram of a prior art device.

The prior art device of FIG. 1 has been discussed above and does not require any further discussion in order to illuminate the advantages of the present invention.

Figure 2:
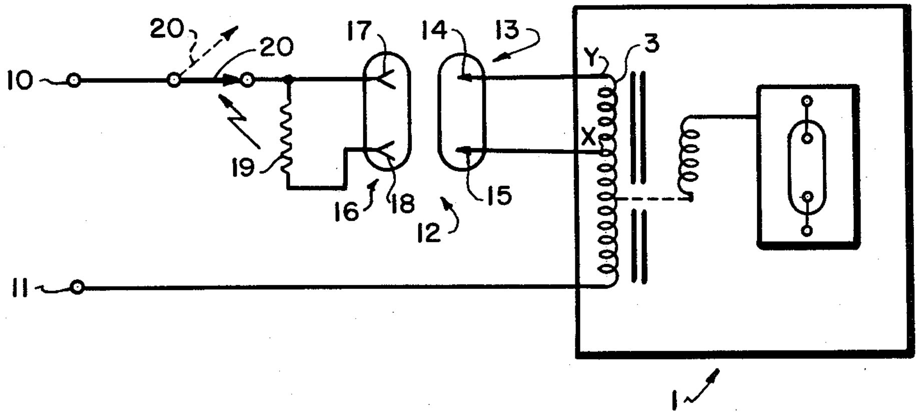
FIG. 2 is a circuit diagram of a thermal protection device in accordance with the invention.

The invention shown in FIG. 2 is especially adapted for, but not limited to, use with a conventional dual input voltage transformer/ballast apparatus designed to energize a HID lamp. The circuit details of the transformer/ballast apparatus 1 are not shown since they are conventional and are not required in order to understand the principles of the invention.

A pair of input terminals 10, 11 are provided for connecting the apparatus to the input lines of either a 120 V AC supply voltage or a 277 V AC supply voltage, depending on the particular installation. A non-polarized reversible connector 12 includes a male plug 13 having terminals 14, 15 connected to the terminals Y and X, respectively, of the transformer primary winding 3 of the ballast apparatus 1. The female plug 16 of the connector 12 has terminals 17 and 18 connected to the terminals of a heating resistor 19. The heating resistor 19 is part of a thermal switch having a normally closed contact arm 20 that connects the input terminal 10 to the transformer winding 3 via the non-polarized connector 12. The heating resistor 19 is thermally coupled to normally closed contact arm 20 as indicated by the jagged arrow. The thermal switch may consist of a resistive heater winding wound over a bimetallic switch. A similar device is manufactured by GTE Products Corporation and is designated as the RP-1B recessed fixture protector. The GTE device, with its 120 V tolerant resistor, can be modified for operation at 157 V (277 V−120 V) by the addition of a 2,000 ohm, 1 watt resistor, or like modification of its internal resistance winding. The other input terminal 11 is connected to the bottom terminal of the transformer winding 3.

In the case of a dual input ballast, it is advantageous that the thermal protection device be capable of interrupting power from either of two "hot" input lines, and in a fool proof manner whereby the apparatus will automatically turn itself off if the apparatus is incorrectly connected to the source of input voltage. It is also important to provide a system which will make it difficult for a field technician to bypass the protection device.

Assume that the terminals 10, 11 of the thermal protection device are to be connected to an AC supply voltage of 277 V. In that case, the female plug of the reversible non-polarized connector 12 is inserted into the male plug so that the terminal 17 will be connected to terminal 14 and terminal 18 will be connected to terminal 15. If now we choose the winding relation of transformer winding 3 so that there are 554 turns in all and 240 turns between terminal X and the bottom end of the winding, then the voltage appearing across terminals Y and X of winding 3 will be 277 V−120 V=157 V.

The heating resistor 19 and the bimetallic switch 20 will be chosen so that in normal operation of the ballast apparatus 1 the resistor will heat up and couple heat to the bimetallic switch element such that the switch temperature is just below its trip point, i.e. the point at which the contact arm 20 will open the connection from input terminal 10 to the connector 12 and heating wire 19. If some insulation material were now placed too close to the fixture containing the thermal protection device, self heating and reduced thermal dissipation of the device's resistor would heat up the bimetallic switching element and cause it to trip out and thereby open the current line from input terminal 10 to the ballast apparatus and the heating resistor.

The heating resistor would therefore no longer heat the switching element, which would then cool down and close the line from terminal 10 to the primary winding 3 of the ballast apparatus. The heating resistor would heat up again, tripping the switching arm 20. The resultant intermittent operation of the load, e.g. a HID lamp, would provide a visible signal that the apparatus required service.

If, instead, it was desired to connect the ballast apparatus to a 120 V source of AC voltage at terminals 10, 11, all that would be required would be to reverse the female plug 16 so that terminal 18 was connected to terminal 14 of the male plug 13 and terminal 17 was connected to terminal 15. With these connections, 120 volts is applied between the bottom terminal of winding 3 and the tap point terminal X on the winding. This voltage is stepped up by autotransformer action so that, by virtue of the choice of the winding ratio, 157 V is once again developed across the portion of the winding between the terminals X and Y thereof.

As a result, the heating resistor 19 again heats up to a point just below the trip point of the normally closed switch 20. Additional heating caused by nearby insulation material or other abnormal conditions will trip the switch 20 and break the power connection in the manner described above for the 277 V operation.

The thermal protection device described is also error proof. For example, assume that the supply voltage is 120 V and the connector 16 is accidentally connected for 277 V operation, i.e. terminals 17 and 14 and terminals 18 and 15, respectively, are directly connected to one another. Since proper operation of the ballast apparatus requires 277 V across the entire primary winding 3, the discharge lamp will not ignite because there is now only 120 V applied across the end terminals of winding 3. The refusal of the lamp to ignite will indicate that the plug 16 was connected incorrectly and should be reversed.

In the opposite error condition, that is with a 277 V supply voltage at input terminals 10 and 11 and the plug 16 connected for 120 V operation, i.e. terminal 17 connected to terminal 15 and terminal 16 connected to terminal 14, then 277 V is applied between the lower end terminal and terminal X of the winding 3. Due to the transformer step-up ratio of the windings, a stepped up voltage of over 300 V will now be developed across the part of the winding between terminals X and Y. This will drive the heater winding 19 with a much higher voltage (more than 300 V) than the 157 V at which it is designed to operate. This will now cause the switch arm 20 to operate to its open position due to the higher than normal heat developed by heater wire 19. The discharge lamp will then turn off. The resistor 19 will cool down again, closing the switch 20 and igniting the lamp. The lamp will then turn on and off indicating the the the connector 16 is connected backward for the particular input voltage supplied to terminals 10 and 11.

It will be clear from the foregoing that the thermal protector can be used with other combinations of dual input voltages than the 277 V and 120 V described. It is then only necessary to provide the proper choice of the connection point X on the winding 3 such that a winding ratio Y-X ralative to the whole primary winding causes substatially the same voltage to be developed across winding Y-X in either connection of the reversible connector 16, assuming in each case the connector is connected correctly for the particular one of the two possible input voltages. The heating resisting-bimetallic switch combination (19,20) operates on the differential voltage, i.e. the voltage difference between the two AC input voltages (e.g. 277 V−120 V=157 V). The heater resistor must likewise be sized for the pertinent voltages.

It will also be clear that the invention makes it possible to modify in a relatively simple manner an existing dual input voltage fixture that does not have a thermal protection device. The ballast will not require any additional leads to modify it to include the thermal protection device. The connections to be made in the field are merely to connect the "hot" input lead to the normally closed switch and the neutral line to the common line connected to the lower end of winding 3. The invention thus simplifies the field installer's job and is error proof since it automatically provides a signal if the connector is reversed relative to the particular line input voltage.

The thermal protection device interrupts the power to the ballast in the case where excessive heat is developed due to nearby insulation.

Although the invention has been described in detail herein in accordance with a preferred embodiment thereof, many modifications and changes therein may be effected by those skilled in the art. For example, the invention may be used with different types of loads other than discharge lamps. Accordingly, it is intended that the appended claims cover all such modifications and changes as fall within the true spirit and scope of the invention.

We claim:

1. A thermal protection device for a dual input transformer/ballast apparatus comprising: a pair of input terminals for connection to either one of two possible sources of AC supply voltage of different RMS levels, a thermal switch comprising a resistive heating element and a heat responsive normally closed switching element, a non-polarized reversible connector having a first plug with first and second terminals connected to terminals of the heating element and a second plug with a third terminal connected to a first terminal of a transformer winding of the ballast apparatus and a fourth terminal connected to a tap point on said transformer winding, means connecting a first one of said input terminals to the first terminal of the first plug via the normally closed switching element, and means for connecting a second one of the input terminals to a second terminal of said transformer winding, and wherein said tap point is chosen so that when the first and second plugs of the connector are properly connected together for the input voltage at the input terminals, approximately the same voltage is developed across the winding located between the first terminal of the transformer winding and the tap point for either of the two possible input voltages, whereby approximately the same heating current will flow in the heating element for each of the two possible input voltages.

2. A thermal protection device as claimed in Claim 1 wherein the thermal switch comprises a resistive winding wound about or near a bimetallic switch element.

3. A thermal protection device as claimed in claim 1 wherein said heating element is arranged to operate with a nominal operating voltage that is the difference between first and second sources of AC supply voltage of 120 volts and 277 volts.

4. A thermal protection device as claimed in claim 3 wherein the tap point is chosen so that the turns of the transformer winding between the second terminal of the winding and the tap point thereof and the turns of the transformer winding between the first and second terminals of the transformer winding are in the ratio of 120:277.

5. A thermal protection device as claimed in claim 1 wherein the tap point is chosen so that the turns of the transformer winding between the second terminal of the winding and the tap point thereof and the turns of the transformer winding between the first and second terminals of the transformer winding are in the ratio of the RMS value of a first one of the two possible AC supply voltages to the RMS value of the second one of the two possible AC supply voltages.

6. A thermal protection device as claimed in claim 1 wherein the transformer/ballast apparatus operates a discharge lamp.

7. A thermal detection device as claimed in claim 1 wherein said pair of input terminals provide the only connection of the transformer/ballast apparatus to the source of AC supply voltage.

8. A thermal protection device for connection to a load including an incandescent lamp comprising:

a pair of input terminals for connection to either one of two sources of AC supply voltage of different RMS levels, a transformer for coupling the load to said input terminals, a thermal switch comprising a resistive heating element thermally coupled to a heat responsive normally closed switching element, a non-polarized reversible connector having first and second terminals connected to terminals of the heating element and a third terminal connected to a first terminal of a winding of the transformer and a fourth terminal connected to a tap point on said transformer winding, means for connecting a first one of said input terminals to the first terminal of the connector via the normally closed switching element, and means for connecting a second one of the input terminals to a second terminal of said transformer winding, and wherein said tap point is chosen so that when the terminals of the connector are properly connected together for the input voltage at the input terminals, approximately the same voltage is developed across the winding located between the first terminal of the transformer winding and the tap point for either of the two input voltages, whereby approximately the same heating current will flow in the heating element for each of the two input voltages.

9. A thermal protection device for connection to a load including a transformer winding having at least two terminals for connection to the thermal protection device, said thermal protection device comprising:

a two-wire reversible connector having first and second terminals reversibly connectable to third and fourth terminals of the connector, a thermal switch comprising a heat responsive normally closed switching element for connecting one of said transformer winding terminals to a terminal of a source of AC supply voltage via said reversible connector and a resistive heating element in thermal coupling relationship with said switching element and having first and second terminals for connection to said two terminals of the transformer winding via said reversible connector whereby, in operation, at least a part of said transformer winding supplies a bias voltage for the resistive heating element of the thermal switch.

10. A thermal protection device as claimed in claim 9 adapted to couple the load to a source of AC supply voltage of either 120 V or 277 V wherein said resistive heating element is designed to operate at a nominal voltage of approximately 157 volts.

11. A thermal detection device for coupling a discharge lamp load to an input terminal for either one of first and second sources of AC supply voltage of different values of RMS voltage, said load including a transformer winding having first and second terminals for connection to the thermal detection device, said thermal detection device comprising:

a thermal switch including a heat responsive normally closed switching element thermally coupled to a heating element, a reversible connector having first and second terminals reversibly connectable to third and fourth terminals of the connector, means connecting the heating element to said first and second connector terminals, means for connecting the first connector terminal to the input terminal via said normally closed switching element, and means for connecting the connector third and fourth terminals to said first and second terminals, respectively, of the transformer winding so that the heating element will be coupled to said transformer first and second terminals in either position of the reversible connector, said connector having first and second positions corresponding to said first and second sources of AC supply voltage, respectively, whereby a voltage is produced across said transformer first and second terminals, when connected to the thermal detection device, such that the same value of voltage is developed across the heating element in each of the first and second positions of the reversible connector.

12. A thermal detection device as claimed in claim 11 wherein the heating element has a nominal operating voltage equal to the differential voltage of the first and second AC supply voltages.

13. A thermal detection device as claimed in claim 12 wherein the first and second AC supply voltages are 277 V and 120 V, respectively, and said differential voltage is 157 V.

14. A thermal detection device as claimed in claim 13 wherein the transformer winding has a third terminal for connection to a second input terminal of the source of AC supply voltage, said first, second and third terminals being connected to points on the transformer winding such that the ratio of the number of winding turns between the second and third terminals to the number of winding turns between the first and third terminals is 120/277.

15. A thermal detection device as claimed in claim 11 comprising only three external connection terminals, a first connection terminal for connecting the switching element to said input terminal and said third and fourth connector terminals comprising second and third connection terminals.

* * * * *